US012762944B2

(12) United States Patent
Abbott et al.

(10) Patent No.: US 12,762,944 B2
(45) Date of Patent: Oct. 13, 2026

(54) DATA LOGGING IN A FIRE ALARM SYSTEM

(71) Applicant: Tyco Fire & Security GmbH, Neuhausen am Rheinfall (CH)

(72) Inventors: Phillip Abbott, London (GB); Michael Edward Mayhew, Ashford (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 25 days.

(21) Appl. No.: 18/943,197

(22) Filed: Nov. 11, 2024

(65) Prior Publication Data

US 2025/0166490 A1 May 22, 2025

(30) Foreign Application Priority Data

Nov. 17, 2023 (GB) ..................................... 2317663

(51) Int. Cl.

| | |
|---|---|
| ***G08B 29/14*** | (2006.01) |
| ***G06F 17/40*** | (2006.01) |
| ***G08B 25/14*** | (2006.01) |
| ***G08B 29/04*** | (2006.01) |

(52) U.S. Cl.

CPC ........... *G08B 29/145* (2013.01); *G06F 17/40* (2013.01); *G08B 25/14* (2013.01); *G08B 29/043* (2013.01)

(58) Field of Classification Search

CPC .... G08B 29/145; G08B 25/14; G08B 29/043; G06F 17/40

See application file for complete search history.

(56) References Cited

U.S. PATENT DOCUMENTS

| | | | |
|---|---|---|---|
| 4,141,006 | A | 2/1979 | Braxton |
| 4,581,606 | A | 4/1986 | Mallory |
| 4,644,286 | A | 2/1987 | Torre |
| 4,658,243 | A | 4/1987 | Kimura et al. |
| 4,778,552 | A | 10/1988 | Benge et al. |
| 4,818,312 | A | 4/1989 | Benge |

(Continued)

FOREIGN PATENT DOCUMENTS

| | | |
|---|---|---|
| AU | 06693/14 B2 | 5/1996 |
| AU | 96108/98 A | 2/1999 |

(Continued)

OTHER PUBLICATIONS

Extended European Search Report issued in corresponding EP24213741.2 dated Mar. 28, 2025.

(Continued)

*Primary Examiner* — John A Tweel, Jr.

(74) *Attorney, Agent, or Firm* — ArentFox Schiff LLP

(57) ABSTRACT

A method of data logging in a fire alarm system comprising a data logger device located within a casing of a fire alarm control panel of the fire alarm system, comprising: communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection; and logging the detector values into one or more data stores of the data logger device.

23 Claims, 7 Drawing Sheets

(56) References Cited

U.S. PATENT DOCUMENTS

| | | | | |
|---|---|---|---|---|
| 5,023,600 | A | 6/1991 | Szklany et al. | |
| 5,189,397 | A | 2/1993 | Watkins et al. | |
| 5,493,271 | A | 2/1996 | Kobayashi et al. | |
| 5,519,379 | A | 5/1996 | Ho et al. | |
| 5,526,133 | A | 6/1996 | Paff | |
| 5,734,321 | A | 3/1998 | Takahashi | |
| 5,781,111 | A | 7/1998 | Easter et al. | |
| 5,864,286 | A | 1/1999 | Right et al. | |
| 6,366,211 | B1 | 4/2002 | Parker | |
| 6,389,331 | B1 | 5/2002 | Jensen et al. | |
| 6,960,987 | B2 * | 11/2005 | Dohi | G08B 25/14 340/506 |
| 7,248,157 | B2 | 7/2007 | Bergman et al. | |
| 7,429,921 | B2 | 9/2008 | Seeley et al. | |
| 7,528,711 | B2 * | 5/2009 | Kates | G08B 25/009 340/505 |
| 8,836,467 | B1 | 9/2014 | Cohn et al. | |
| 9,978,257 | B1 | 5/2018 | Trundle et al. | |
| 10,339,788 | B2 | 7/2019 | Martin | |
| 11,043,111 | B1 * | 6/2021 | Escofet Via | G08B 29/16 |
| 11,417,195 | B2 | 8/2022 | Rao et al. | |
| 12,033,491 | B2 | 7/2024 | Adam et al. | |
| 2002/0008758 | A1 | 1/2002 | Broemmelsiek et al. | |
| 2004/0222307 | A1 | 11/2004 | Deluca | |
| 2006/0176167 | A1 | 8/2006 | Dohrmann | |
| 2006/0181395 | A1 | 8/2006 | Gruszynski | |
| 2007/0241877 | A1 | 10/2007 | Jobe et al. | |
| 2008/0079582 | A1 | 4/2008 | Alexis et al. | |
| 2008/0284593 | A1 | 11/2008 | Soto et al. | |
| 2009/0256712 | A1 | 10/2009 | Eiden et al. | |
| 2011/0170249 | A1 | 7/2011 | Nunes | |
| 2012/0154138 | A1 | 6/2012 | Cohn et al. | |
| 2012/0154141 | A1 | 6/2012 | Piccolo, III | |
| 2013/0024800 | A1 | 1/2013 | Sundriyal et al. | |
| 2014/0313028 | A1 | 10/2014 | Jiang et al. | |
| 2016/0191265 | A1 | 6/2016 | Cohn et al. | |
| 2017/0091200 | A1 | 3/2017 | El-Mankabady et al. | |
| 2020/0019287 | A1 | 1/2020 | Sahai et al. | |

FOREIGN PATENT DOCUMENTS

| | | | |
|---|---|---|---|
| AU | 2005309628 | A1 | 6/2006 |
| AU | 2019100595 | A4 | 6/2019 |
| CA | 1028147 | A | 3/1978 |
| CA | 1121027 | A | 3/1982 |
| CA | 1180413 | A | 1/1985 |
| CA | 2300648 | A1 | 9/2001 |
| CA | 2485504 | A1 | 5/2005 |
| CA | 2496245 | A1 | 8/2005 |
| CA | 2972556 | A1 | 7/2016 |
| CA | 2928388 | A1 | 7/2017 |
| CN | 1109991 | A | 10/1995 |
| CN | 101076808 | A | 11/2007 |
| CN | 101536052 | A | 9/2009 |
| CN | 101542548 | A | 9/2009 |
| CN | 104537790 | A | 4/2015 |
| CN | 106209934 | A | 12/2016 |
| DE | 3409344 | A1 | 9/1984 |
| DE | 3632966 | A1 | 4/1987 |
| DE | 3828691 | B4 | 11/2004 |
| EP | 0715284 | A2 | 6/1996 |
| EP | 0965964 | A2 | 12/1999 |
| EP | 1182630 | A2 | 2/2002 |
| EP | 1450276 | A2 | 8/2004 |
| EP | 1564700 | A1 | 8/2005 |
| EP | 1995703 | A1 | 11/2008 |
| EP | 2801961 | A1 | 11/2014 |
| EP | 2879105 | B1 | 6/2015 |
| EP | 3441955 | A1 | 2/2019 |
| FR | 2522829 | A1 | 9/1983 |
| GB | 2484459 | A | 4/2012 |
| IN | 201714021560 | | 1/2018 |
| JP | 62-174899 | A | 7/1987 |
| JP | 03-195223 | A | 8/1991 |
| JP | 04-290198 | A | 10/1992 |
| JP | 05-242375 | A | 9/1993 |
| JP | 06-267485 | A | 9/1994 |
| JP | 06-290039 | A | 10/1994 |
| JP | 08-240044 | A | 9/1996 |
| JP | 2930372 | B2 | 8/1999 |
| JP | 2000-113352 | A | 4/2000 |
| JP | 2000-259959 | A | 9/2000 |
| JP | 2002-298251 | A | 10/2002 |
| JP | 2003-132454 | A | 5/2003 |
| JP | 2003-157223 | A | 5/2003 |
| JP | 2003-229880 | A | 8/2003 |
| JP | 2004-110113 | A | 4/2004 |
| JP | 2004-126880 | A | 4/2004 |
| JP | 2004-206361 | A | 7/2004 |
| JP | 2008-282221 | A | 11/2008 |
| JP | 2011-205525 | A | 10/2011 |
| JP | 2014-016679 | A | 1/2014 |
| JP | 2022-146404 | A | 10/2022 |
| KR | 10-1697935 | B1 | 2/2017 |
| KR | 10-1870168 | B1 | 7/2018 |
| WO | 00/45227 | A2 | 8/2000 |
| WO | 01/75835 | A1 | 10/2001 |
| WO | 2006/133058 | A2 | 12/2006 |
| WO | 2008/002304 | A1 | 1/2008 |
| WO | 2008/031193 | A1 | 3/2008 |
| WO | 2013/015903 | A1 | 1/2013 |
| WO | 2014/045006 | A1 | 3/2014 |
| WO | 2019/154635 | A1 | 8/2019 |
| WO | 2020/225080 | A1 | 11/2020 |
| WO | 2022137264 | A1 | 6/2022 |

OTHER PUBLICATIONS

Search and Examination Report for GB Application No. 2317663.9, dated May 14, 2024, 2 pages.

* cited by examiner

DATA LOGGING IN A FIRE ALARM SYSTEM

CROSS-REFERENCE TO RELATED APPLICATION(S)

This application claims priority to GB Application Serial No. 2317663.9, filed Nov. 17, 2023, and entitled "DATA LOGGING IN A FIRE ALARM SYSTEM," the contents of which are hereby incorporated herein in the entirety.

FIELD

The present disclosure relates to the logging of data in a fire alarm system.

BACKGROUND

Fire alarm systems, such as the fire alarm system 1 shown in FIG. 1, are installed in many premises, such as office buildings, factories, homes, and the like, and typically include a fire alarm control panel 3 (often known as control and indicating equipment, CIE), a plurality of detectors 4*a*, a plurality of notification appliances 4*b*, and wiring 2 connecting the detectors 4*a* and notification appliances 4*b* to the fire alarm control panel 3. The fire alarm system 1 might also include call points 4*c* and a range of other ancillary modules. In many cases, the wiring 2 which is installed is a 2-wire addressable loop, and the detectors 4*a*, notification appliances 4*b*, call points 4*c*, and other ancillary modules (hereafter called "devices 4") are arranged on the loop connected across its 2 wires. Multiple loops are generally installed from the fire alarm control panel 3, with each loop typically carrying the devices 4 to a different part of the premises. The loops typically provide power to the devices 4 on the loop, and convey instructions and data from the fire alarm control panel 3 to the individual devices 4, such as configuration data to all devices 4 or an alarm signal to the notification appliances 4*b*, and convey data from the devices 4 to the fire alarm control panel 3. Where the device 4 is a detector 4*a*, it generates a detector value corresponding to what the detector 4*a* is sensing, and the loop conveys the detector value to the fire alarm control panel 3. Other devices might generate values too. The looped arrangement provides resilience to a break in an individual loop occurring during operation, and the voltage level between the wires in the loop are maintained sufficiently high to sustain all of the devices 4 around the complete loop. A single fire alarm control panel 3 can support multiple loops of addressable devices 4.

Faults can arise in the fire alarm system 1 which must be identified and resolved, which involves testing the integrity of the loops, and the correct operation of the devices 4 and the fire alarm control panel 3.

A fire alarm condition is indicated when the fire alarm control panel 3 determines that certain conditions are met by the values sent to it by the devices 4. A false alarm is raised when there is not a fire condition but the fire alarm control panel 3 processing the values indicates there is one. This false alarm could be raised for many reasons including poor detector type choice (smoke, heat, etc.) or by poor selection of an algorithm within the fire alarm control panel 3 which assesses the values against the criteria for a fire alarm condition. If the fire alarm system 1 reports unwanted alarm events, an engineer needs to investigate. Once the cause is explained, a technician can take the appropriate action.

The event log contains a record of events such as fire alarm conditions or faults which arise, and identifies when such conditions arose and which device was involved. Fire alarm systems do not have data storage sufficient to collect all available data over a long period of time, because, in fault-free operation, an enormous amount of data would be collected which would require costly large-scale storage.

Fire alarm technicians are known to connect laptop computers to control panels to collect the contents of logs and detector values over a short period of time, but this is generally limited in duration to one to two hours, by the fact that the laptop must generally be supervised by a person to prevent its theft.

An aim of the present disclosure is to permit detector values to be securely collected from the fire alarm control panel 3 over an extended period of time of more than a few hours, preferably extending to more than one day (a 24 hour period).

SUMMARY

A data logging method in a fire alarm system comprising a data logger device that fits within the casing of a fire alarm control panel of the fire alarm system, the data logging method comprising communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection; and logging the detector values into one or more data stores of the data logger device.

The present disclosure permits detector values to be stored in the data logger device to be logged securely over an extended period of time.

In one aspect, a portable data memory device is connectable to the data logger device once it has logged detector values from the fire alarm control panel.

In one aspect, the data logger device comprises logger control software installed thereon before logging data.

Preferably, the data logger device is configured to obtain the detector values by requesting, from the fire alarm control panel, one or more most recently returned values from each of the one or more detectors.

Advantageously, the data logger device may learn addresses of the detectors without needing pre-configuration. For example, the data logger device may learn the addresses by requesting a detector value for each address that is configurable on each addressable loop that is connectable to the fire alarm control panel; and recording only the addresses which correspond to a detector being present on a connected addressable loop. In this way, pre-configuration of the data logger device is not required.

According to a second aspect, a fire alarm control panel of a fire alarm system includes: a casing; one or more processors; one or more data stores; a data connection; wherein the fire alarm system comprises one or more detectors communicatively coupled with the fire alarm control panel via a wired or wireless connection; and a data logger device within the casing of the fire alarm control panel, the data logger device having one or more data stores and a data interface that is connected to the data connection of the fire alarm control panel, wherein the data logger device is configured to: communicate, via the data interface of the data logger device that is connected to the data connection of the fire alarm control panel, with the one or more processors of the fire alarm control panel, to obtain detector values stored in the one or more data stores of the fire alarm control panel; and log the detector values into the one or more data stores of the data logger device.

Advantageously, the data logger device comprises logger control software installed thereon for managing communication with the fire alarm control panel, and for managing the operation of the data logger device.

Preferably, the data logger device is a single board computer.

In this disclosure, references to a single-board computer (SBC) are to a complete, functioning computer in which its microprocessor, input/output functions, memory, and other features are all built on a single circuit board, with RAM built in and with no expansion slots for peripherals. Examples of SBCs are the Raspberry Pi®, the Arduino® and the ASUS® Tinker Board.

BRIEF DESCRIPTION OF THE DRAWINGS

The present disclosure will now be described by way of example only with reference to the accompanying drawings in which.

DETAILED DESCRIPTION

Figure 2:
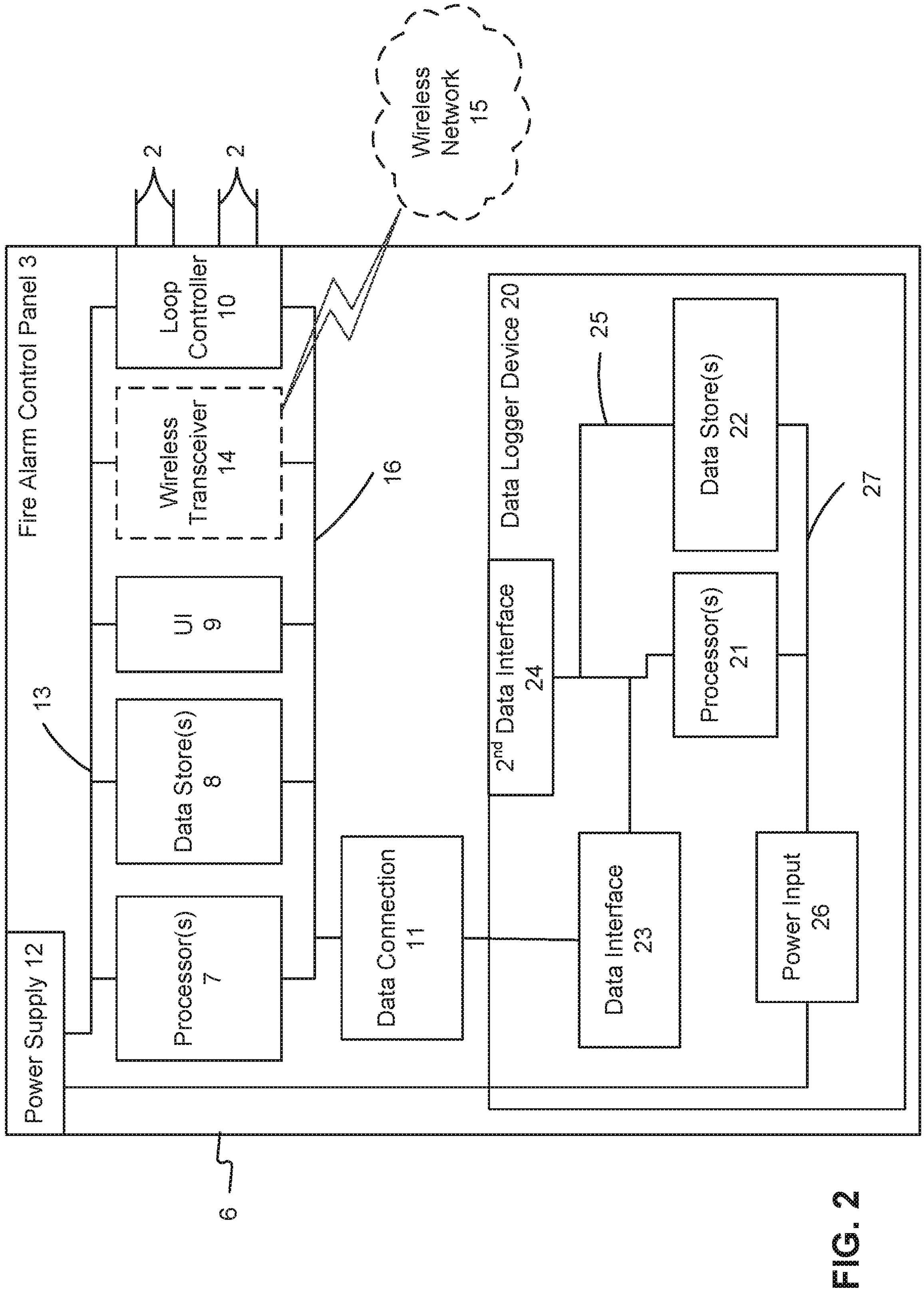
FIG. 2 is a block diagram showing a fire alarm control panel including a data logger device according to the present disclosure.

FIG. 2 shows the fire alarm control panel 3 having a casing 6 within which are one or more processors 7, one or more data stores 8, a user interface 9, a loop controller 10, a data connection 11, a power supply 12, and an optional wireless transceiver 14 (e.g., a radio, etc.) that provides a communication link over a wireless network 15. The power supply 12 supplies power to the one or more processors 7, one or more data stores 8, loop controller 10, wireless transceiver 14, and user interface 9 via power wiring 13. A data bus 14 is connected between the one or more processors 7, one or more data stores 8, user interface 9, loop controller 10, wireless transceiver 14, and data connection 11. The data bus 14 permits data communication between each of those components.

The one or more processors 7 control the operation of the fire alarm control panel 3. The one or more processors 7 communicate with each of the devices 4 by instructing communications to be sent to the devices 4 via the loop controller 10 (for those devices 4 that are communicatively coupled with the fire alarm control panel 3 via the wiring 2) or via the wireless transceiver 14 (for those devices 4 that are communicatively coupled with the fire alarm control panel 3 via the wireless network 15).

The loop controller 10 includes a plurality of ports for connection to the wiring 2. Communication received from the devices 4 by an applicable one of the loop controller 10 or the wireless transceiver 14 are communicated via the data bus 14 to the one or more data stores 8 and the one or more processors 7 which act according to their programming to determine any consequent actions. For example, if a detector 4*a* sends a communication giving a detector value which exceeds a threshold corresponding to a fire condition, the one or more processors 7 will instruct the loop controller 10 or the wireless transceiver 14, whichever applicable, to send an alarm signal to the notification appliances 4*b*, so as to alert people to the detection of a fire, and will instruct the one or more data stores 8 to record an alarm condition in the event log.

Communication with devices 4, whether on the wiring 2 or on the wireless network 15, takes place using a Command/Response protocol where the one or more processors 7 direct the loop controller 10 or the wireless transceiver 14, whichever applicable, to poll each of the devices 4 with an addressed command, and when a device 4 receives a command addressed for it, the device 4 carries out the instruction and sends a response on the wiring 2 or the wireless network 15, whichever applicable, for the fire alarm control panel 3 to receive. The command from the loop controller 10 or the wireless transceiver 14, whichever applicable, to a device 4 could, for example, instruct the device 4 to enter data into its memory, such as configuration data, or the command could instruct the device 4 to send some data to the fire alarm control panel 3 over the loop, or the command could request an alarm status if the device 4 is a detector 4*a*, or the command could request a value from the device 4 if the device 4 is a detector 4*a*, or the command could instruct the device 4 to sound an alarm if the device 4 is a notification appliance 4*b*. Every device 4 is polled about every 5 seconds.

The one or more data stores 8 include the event log which stores a record of significant events, such as an alarm condition or when a fault is identified. The log also records the time and date of the event, and the source of the event.

The one or more data stores 8 also store other data, including the values returned by the devices 4 when they are polled by the fire alarm control panel 3, and it is this data which the one or more processors 7 are described above as comparing with a threshold value to determine whether a fire condition exists. Since every device 4 is polled about every 5 seconds, to avoid collection of a very large amount of information, the value returned by a device 4 replaces or overwrites the value returned on the previous polling event so that only the most recent value is stored.

When faults arise in communication between the fire alarm control panel 3 and the devices 4 on the wiring 2 or on the wireless network 14, whichever applicable, for example, by errors in installation, or by noise, the cause can be difficult to diagnose because they are often intermittent, and because there is insufficient data. In this scenario, technicians typically rely on the event log in the one or more data stores 8 of the fire alarm control panel 3, but event logs contain a limited amount of information, and don't give the exact cause for communication failure. It has been determined that diagnosis of the cause can be aided by analysing the values returned to the fire alarm control panel 3 by the devices 4 over a longer period of time, for example for a day or a week.

The user interface 9 allows for a technician or other authorised person to enter data into the fire alarm control panel 3, and to view information about the status of the fire alarm system 1. For example, the user interface 9 will typically include a keypad and a display which is a combination of status lights and an LED screen.

A data connection 11 is present on the data bus 14 to allow other devices, such as diagnostic tools, to be plugged into the fire alarm system 1 with access to the data bus 14.

Since the one or more data stores 8 only retain the most recent values returned to the fire alarm control panel 3 by the devices 4, diagnosis of problems is constrained by the fact that values returned over a longer period are not available to a technician. To overcome this problem, and to ensure security of any data logging equipment, in the present aspects a data logger device 20 is used which is a single board computer, as defined above. The single board computer comprises one or more processors 21 (e.g., one or more CPUs), one or more data stores 22, a data interface 23, and a second data interface 24, all of which are connected to a data bus 25. The data logger device 20 also includes a power input 26 which supplies power to at least the one or more processors 21 and the one or more data stores 22. In some non-limiting aspects, the data logger device 20 is a Raspberry Pi loaded with control software stored on the one or more data stores 22 to control its operation. An essential characteristic of the data logger device 20 is that it is very compact and small enough to fit within the casing 6 of the fire alarm control panel 3.

The data logger device 20 is shown in FIG. 2 as being located within the casing 6 of the fire alarm control panel 3 with the power input 26 connected to the power supply 12 and the data interface 23 connected to the data connection 11. Once installed, the data logger device 20 is securely located within the casing 6 to minimise the risk of theft.

Figure 3:
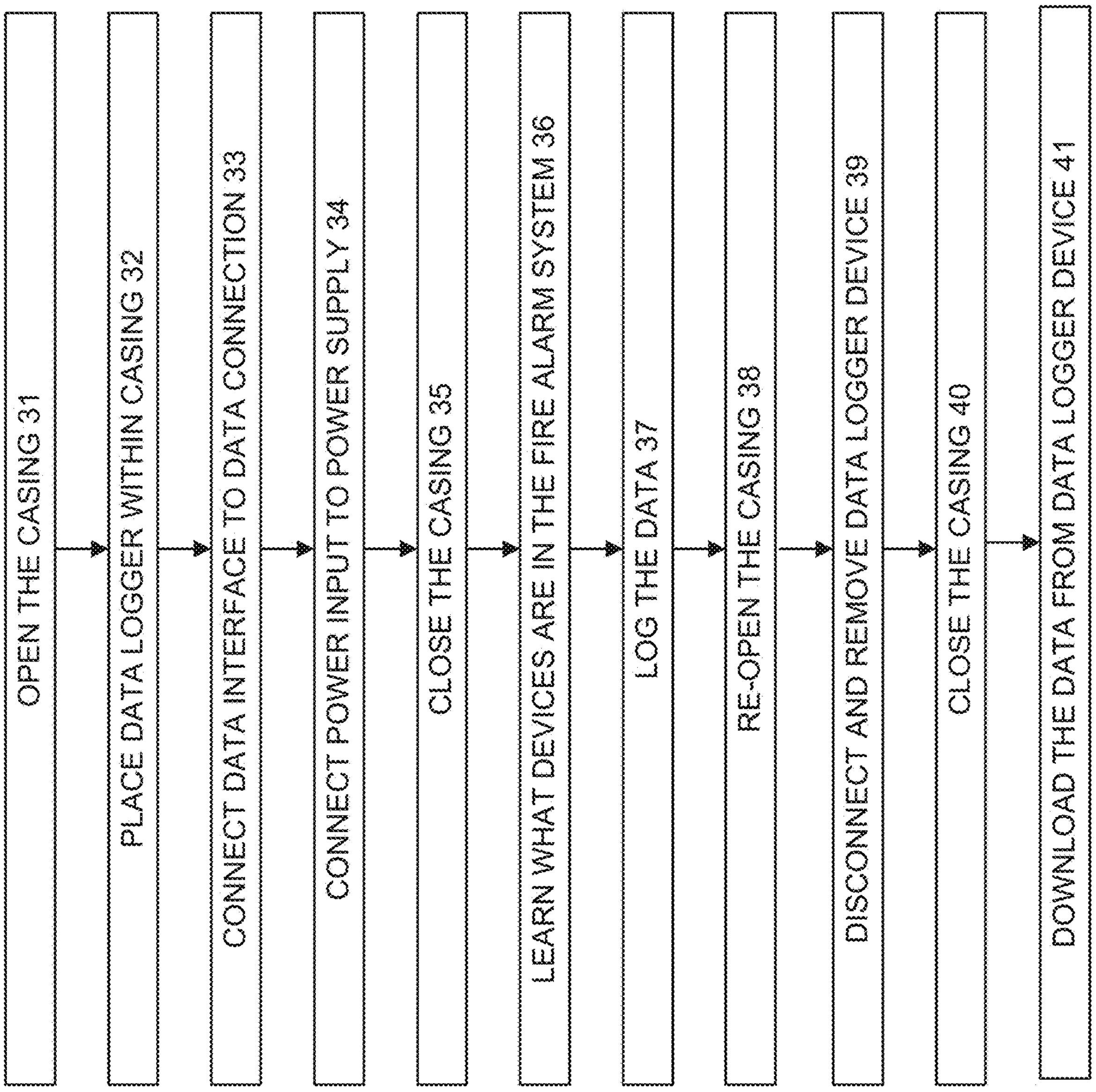
FIG. 3 is a flow diagram showing the steps involved in carrying out the present disclosure to place a data logger device into a fire alarm control panel.

A method of logging data from the fire alarm control panel 3 of the fire alarm system 1 will now be described with reference to FIG. 3.

Step one 31 is to open the casing 6 of the fire alarm control panel 3.

Step two 32 is to place the data logger device 20 within the casing 6 of the fire alarm control panel 3. It might be appropriate to secure the data logger device 20 within the casing 6, for example, with zip ties.

Step three 33 is to connect the data interface 23 of the data logger device 20 to the data connection 11 of the fire alarm control panel 3 with a cable so that data can be passed from the data connection 11 to the data interface 23.

Step four 34 is to connect the power input 26 of the data logger device 20 to the power supply 12 within the casing 6 of the fire alarm control panel 3. However, the data logger device 20 could be battery powered, in which case, this step would not be required.

Step five 35 is to close the casing 6 of the fire alarm control panel 3 with the data logger device 20 located securely inside.

Step six 36 is the learning of what detectors **4*a* are in the fire alarm system 1 and the addresses of those detectors 4*a*. This is done by the one or more processors 21 of the data logger device 20 sending a request to the one or more processors 7 of the fire alarm control panel 3 for the value of a device having a first address, say Loop 1, address 001, via the data bus 25 of the data logger device 20, the data interface 23, the data connection 11, and the data bus 14 of the fire alarm control panel 3 for the current value held in the one or more data stores 8 for that device. If there is a detector at this address, the one or more data stores 8 return the detector value back to the data logger device 20 where that value is stored in the one or more data stores 22 together with the time and date of collection, and the identity of the device 4 that the value came from. If there is no detector with that address, the one or more data stores 8 report this to the data logger device 20, which ensures that no future requests are made corresponding to that address. The one or more processors 21 repeat this process with Loop 1, address 002 and all the other possible addresses, and log both the values of all the sensor devices 4*a***, and learn which addresses to request future values about, and which to exclude.

Step seven 37 of logging the values can then take place. It will be realised that, once steps one to four have been completed, the logging of data might be expected to start before the casing 6 is actually closed. Logging is done by the one or more processors 21 of the data logger device 20 sending a request to the one or more processors 7 of the fire alarm control panel 3 via the data bus 25 of the data logger device 20, the data interface 23, the data connection 11, and the data bus 14 of the fire alarm control panel 3 for the current value held in the one or more data stores 8 for a particular detector. The one or more data stores 8 return that value back to the data logger device 20 where that value is stored in the one or more data stores 22 together with the time and date of collection, and the identity of the detector 4 that the value came from. Some detectors have more than one sensing element, such as smoke and heat sensing elements, so more than one value might be available, in which case all of the values are stored by the data logger device 20. Once a value has been stored, the data logger device 20 requests the value of the next detector 4, and this is repeated until the values originating from all of the detectors 4 have been collected and stored.

It is important that the data logger device 20 doesn't put the fire alarm control panel 3 under too great a load as the fire alarm control panel 3 must remain fully operational during the logging. For this reason, the data logger device 20 throttles its requests. One way to do this is to request values at a frequency, for example, of X requests per second, at which it is known that the fire alarm control panel 3 is capable of remaining fully operational. An alternative is to have a timed pause following the receipt of a value before requesting the next one, say 0.2 s. The reason this is advantageous is that this functionality introduces a dynamic component to the requests because, if the fire alarm control panel 3 is under greater than average load, it will take longer to return a value, and this causes a reduction in the frequency of requests made to the fire alarm control panel 3 for values.

It will be appreciated that not all of the values will be stored in the data logger device 20 because the frequency of value logging will generally be less than the frequency at which they are acquired by the fire alarm control panel 3. However, enough data will be logged to make diagnosis of problems much easier, and the safe operation of the fire alarm control panel 3 will not be compromised by the logging process.

The data stored will include the time/date, device type, device address, monitored values, etc.

Step eight 38 is carried out once the data logger device 20 has been operating for a long enough time that the data logger device 20 will have collected sufficient amount of data, and includes reopening the casing 6.

Step nine 39 is to disconnect the data logger device 20 from the fire alarm control panel 3 and to remove it from the casing 6.

Step ten 40 is to close the casing 6.

Step eleven 41 is to download the data from the data logger device 20. This might be done in a number of ways. A portable data memory device can be plugged into the second data interface 24 in order to download the data onto the portable data memory device so that the data can then be analysed, for example, by being plugged into a laptop computer. Alternatively, a laptop computer could be plugged directly into the second data interface 24 of the data logger 20 and download the data directly.

Once the data has been analysed, if a situation can be identified (e.g., a fault or cause of false alarms) based on the data which has been analysed, appropriate action can be taken.

Various further modifications to the above-described examples, whether by way of addition, deletion or substitution, will be apparent to the skilled person to provide additional examples, any and all of which are intended to be encompassed by the appended claims.

Figure 1:
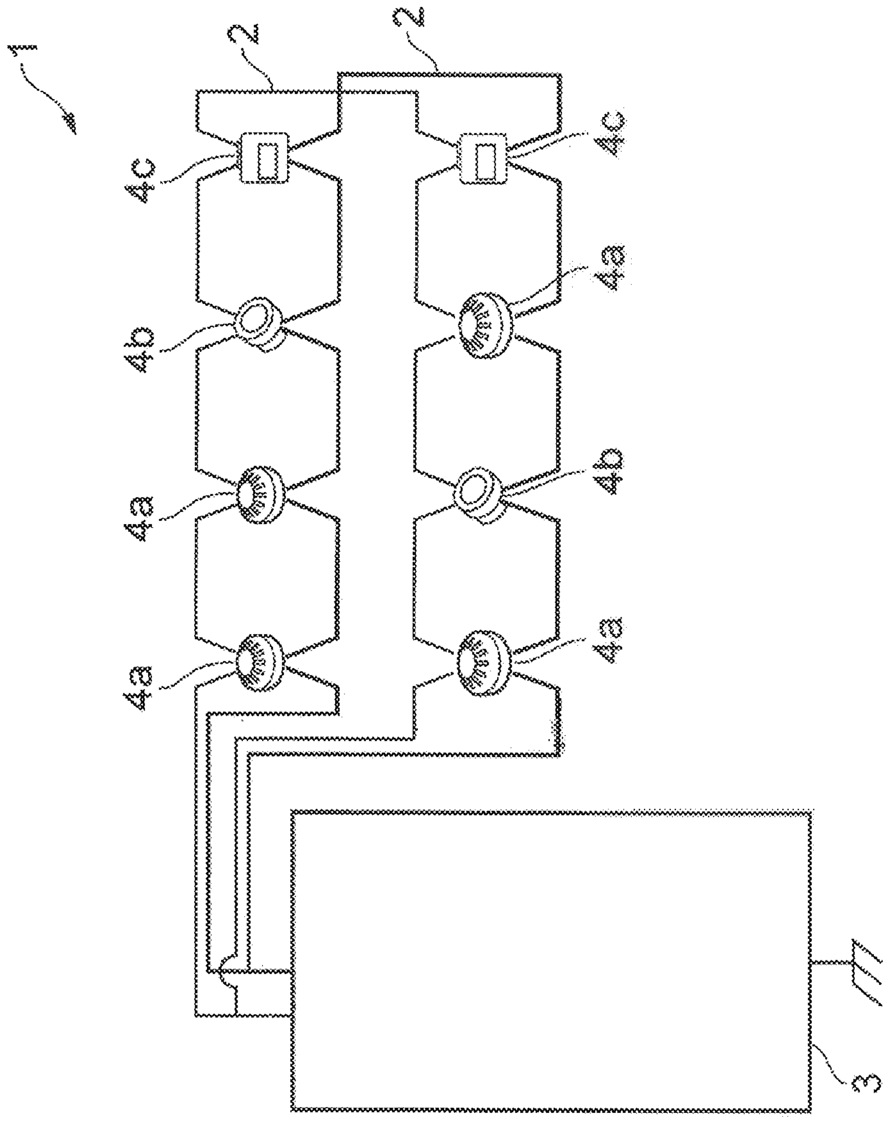
FIG. 1 PRIOR ART
FIG. 1 is a block diagram showing a known fire alarm system.
Figure 4:
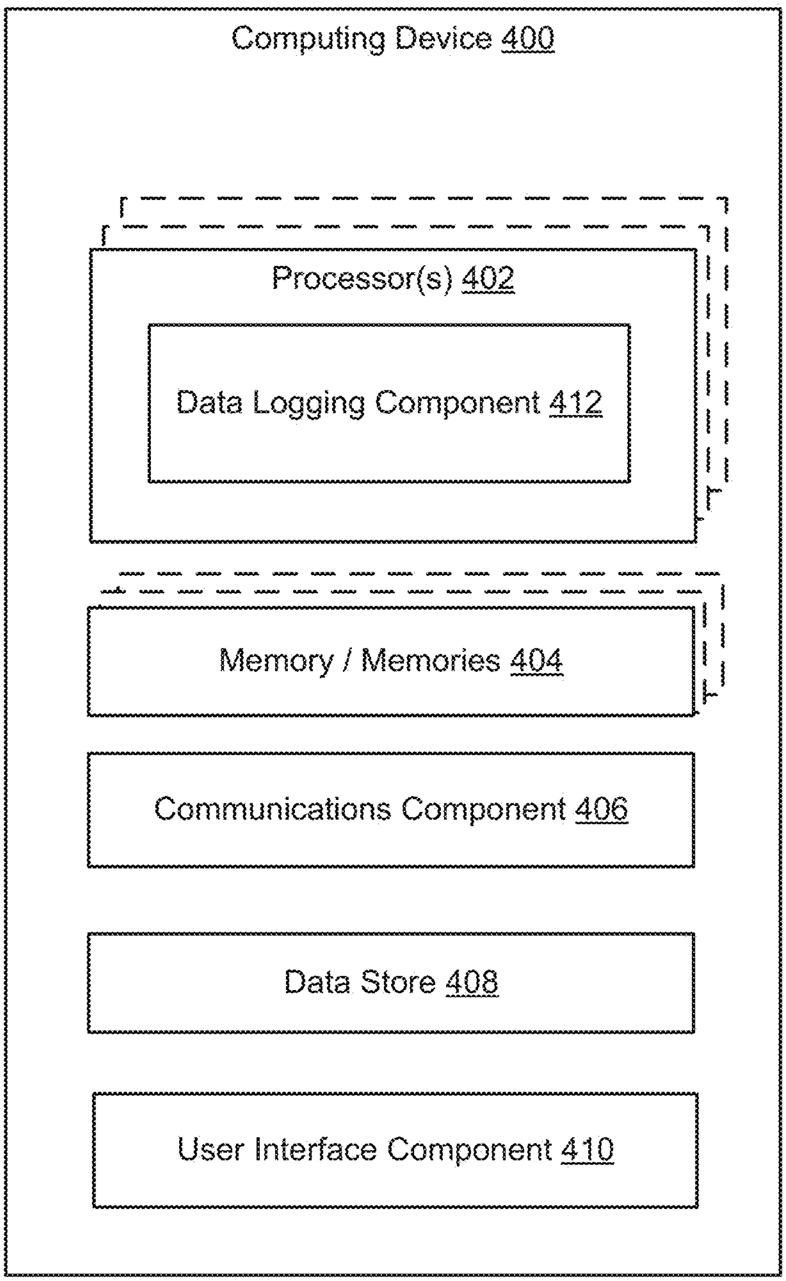
FIG. 4 is a block diagram of an example computing device which may implement all or a portion of any component or functionality described with reference to FIGS. 1-3 above or 5-7 below, according to some aspects of the present disclosure.

Referring to FIG. 4, an example block diagram provides details of computing components in a computing device 400 that may implement all or a portion of the fire alarm system 1, the fire alarm control panel 3, the data logger device 20, or any other component described with reference to FIGS. 1-3 above or with reference to FIGS. 5-7 below. The computing device 400 includes one or more processors 402 which, individually, as a subgroup, or in combination, may be configured to execute or implement software, hardware, and/or firmware modules that perform any data logging functionality described with reference to FIGS. 1-3 above or with reference to FIGS. 5-7 below.

As used herein, a processor, at least one processor, and/or one or more processors, individually, as a subgroup, or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

The one or more processors 402 may be a micro-controller and/or may include a single or multiple set of processors or multi-core processors. Moreover, the one or more processors 402 may be implemented as an integrated processing system and/or a distributed processing system.

The computing device 400 may further include one or more memories 404, such as for storing local versions of applications being executed by the one or more processors 402, related instructions, parameters, etc. The one or more memories 404 may include a type of memory usable by a computer, such as random access memory (RAM), read only memory (ROM), tapes, magnetic discs, optical discs, volatile memory, non-volatile memory, and any combination thereof. Additionally, the one or more processors 402 and the one or more memories 404 may include and execute an operating system executing on the one or more processors 402, individually, as a subgroup, or in combination, one or more applications, display drivers, etc., and/or other components of the computing device 400.

As used herein, a memory, at least one memory, and/or one or more memories, individually, as a subgroup, or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually, as a subgroup, or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, In combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Further, the computing device 400 may include a communications component 406 that provides for establishing and maintaining communications with one or more other devices, parties, entities, etc., utilizing hardware, software, and services. The communications component 406 may carry communications between components on the computing device 400, as well as between the computing device 400 and external devices, such as devices located across a communications network and/or devices serially or locally connected to the computing device 400. For example, the communications component 406 may include one or more buses, and may further include transmit chain components and receive chain components associated with a wireless or wired transmitter and receiver, respectively, operable for interfacing with external devices.

Additionally, the computing device 400 may include a data store 408, which can be any suitable combination of hardware and/or software, that provides for mass storage of information, databases, and programs. For example, the data store 408 may be or may include a data repository for applications and/or related parameters not currently being executed by the one or more processors 402, individually, as a subgroup, or in combination. In addition, the data store 408 may be a data repository for an operating system, application, display driver, etc., executing on the one or more processors 402, individually, as a subgroup, or in combination, and/or one or more other components of the computing device 400.

The computing device 400 may also include a user interface component 410 operable to receive inputs from a user of the computing device 400 and further operable to generate outputs for presentation to the user (e.g., via a display interface to a display device). The user interface component 410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 410 may include one or more output devices, including but not limited to a display interface, a speaker, a haptic feedback mechanism, a printer, any other mechanism capable of presenting an output to a user, or any combination thereof.

Referring to FIGS. 4-7, in operation for data logging functionality, computing device 400 may implement at least a portion of one or more components in FIGS. 1-4 above, such as all or at least a portion of the data logger device 20 or any other component configured for data logging functionality. In this case, the computing device 400 may perform any one or any combination of methods 500, 600, 700 such as via execution of a data logging component 412 by one or more processors 402 individually, as a subgroup, or in combination, and/or one or more memories 404 individually, as a subgroup, or in combination. Specifically, computing device 400 may be configured to perform any one or any combination of methods 500, 600, 700 for data logging, as described herein.

Figure 5:
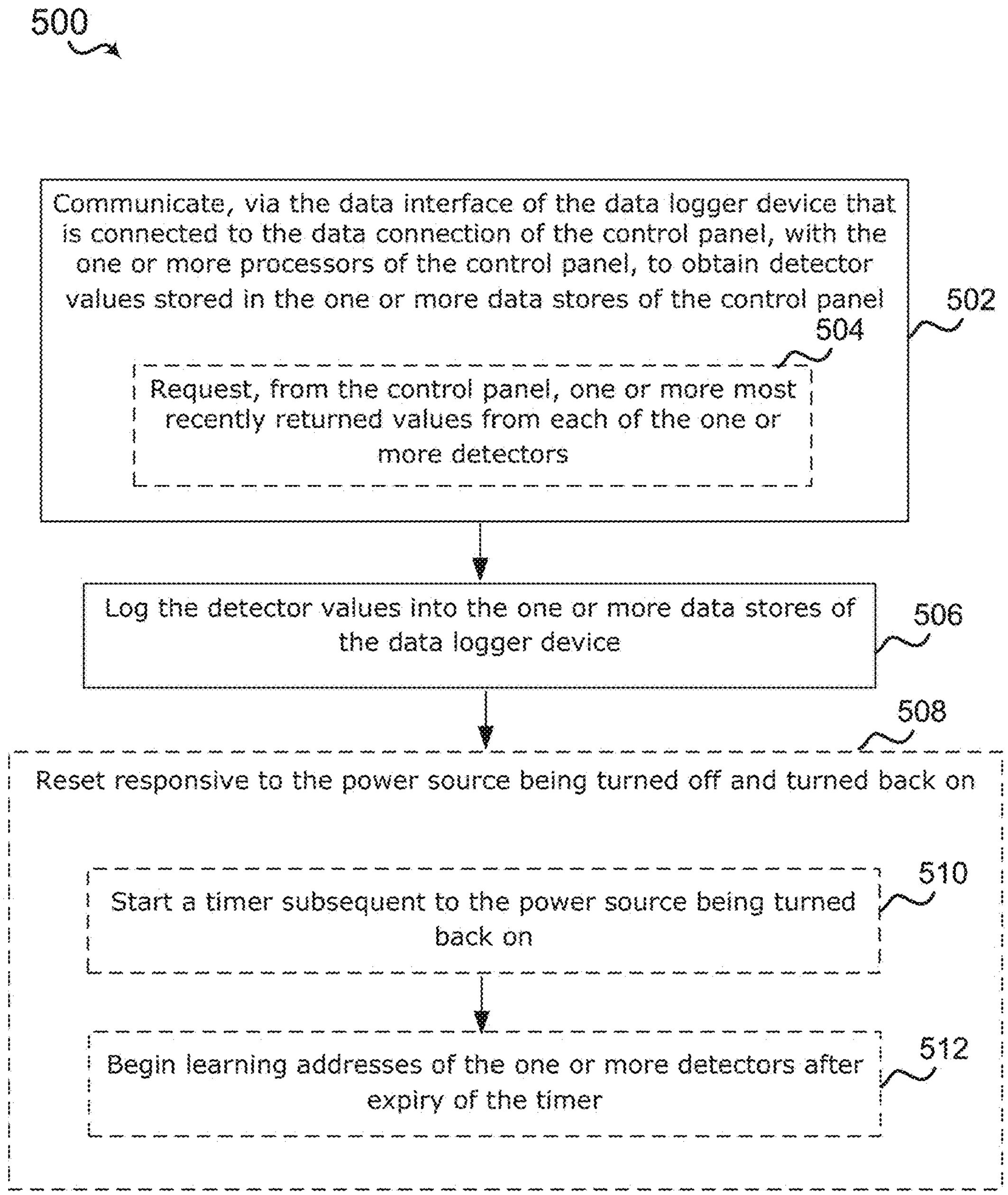
FIG. 5 is a flow diagram of an example method of data logging, according to some aspects of the present disclosure.

Referring to FIG. 5, the method 500 is provided for data logging in a fire alarm system 1 comprising a data logger device 20 located in a casing 6 of a fire alarm control panel 3 of the fire alarm system 1.

At block 502 the method 500 includes communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection. For example, in an aspect, computing device 400, one or more processors 402 individually, as a subgroup, or in combination, one or more memories 404 individually, as a subgroup, or in combination, and/or data logging component 412 may be configured to or may comprise means for communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection.

For example, the one or more processors 21 of the data logger device 20 may communicate with the one or more processors 7 of the fire alarm control panel 3 via the data interface 23 of the data logger device 20 that is connected to the data connection 11 of the fire alarm control panel 3, to obtain detector values stored in the one or more data stores 8 of the fire alarm control panel 3, wherein the fire alarm system 1 comprises one or more detectors 4 communicatively coupled with the fire alarm control panel 3 via a wired or wireless connection.

In some optional implementations, the data logger device 20 comprises logger control software installed thereon before logging data, wherein the logger control software is executable by the one or more processors 21 of the data logger device 20 to perform any data logging functionality described herein.

In some optional implementations, at optional block 504 the method 500 includes requesting, from the fire alarm control panel, one or more most recently returned values from each of the one or more detectors. For example, in an aspect, computing device 400, one or more processors 402 individually, as a subgroup, or in combination, one or more memories 404 individually, as a subgroup, or in combination, and/or data logging component 412 may be configured to or may comprise means for requesting, from the fire alarm control panel, one or more most recently returned values from each of the one or more detectors.

For example, the one or more processors 21 of the data logger device 20 may request, from the fire alarm control panel 3, one or more most recently returned values from each of the one or more detectors 4*a*.

At block 506 the method 500 includes logging the detector values into the one or more data stores of the data logger device. For example, in an aspect, computing device 400, one or more processors 402 individually, as a subgroup, or in combination, one or more memories 404 individually, as a subgroup, or in combination, and/or data logging component 412 may be configured to or may comprise means for logging the detector values into the one or more data stores of the data logger device.

For example, the one or more processors 21 of the data logger device 20 may log the detector values into the one or more data stores 22 of the data logger device 20.

In some optional implementations, a portable data memory device (e.g., a universal serial bus (USB) device) is connectable to the data logger device 20. In these implementations, the data logger device 20 is further configured to download the detector values from the one or more data stores 22 of the data logger device 20 into the portable data memory device.

In some optional implementations, the data logger device 20 is a single board computer.

In some optional implementations, the fire alarm control panel 3 further comprises the power supply 12, wherein the data logger device 20 is powered by the power supply 12 of the fire alarm control panel 3.

In some optional implementations, the fire alarm control panel 3 is configured to reset responsive to the power supply 12 being turned off and turned back on.

In some optional implementations, at optional block 508 the method 500 includes resetting responsive to the power supply being turned off and turned back on. For example, in an aspect, computing device 400, one or more processors 402 individually, as a subgroup, or in combination, one or more memories 404 individually, as a subgroup, or in combination, and/or data logging component 412 may be configured to or may comprise means for resetting responsive to the power supply being turned off and turned back on.

For example, the data logger device 20 may reset responsive to the power supply being turned off and turned back on.

In some optional implementations, the resetting at optional block 508 includes optional blocks 510 and 512 described below.

In some optional implementations, at optional block 510 the method 500 includes starting a timer subsequent to the power supply being turned back on. For example, in an aspect, computing device 400, one or more processors 402 individually, as a subgroup, or in combination, one or more memories 404 individually, as a subgroup, or in combination, and/or data logging component 412 may be configured to or may comprise means for starting a timer subsequent to the power supply being turned back on.

For example, the data logger device 20 may start a timer subsequent to the power supply 12 being turned back on.

In some optional implementations, at optional block 512 the method 500 includes beginning learning addresses of the one or more detectors after expiry of the timer. For example, in an aspect, computing device 400, one or more processors 402 individually, as a subgroup, or in combination, one or more memories 404 individually, as a subgroup, or in combination, and/or data logging component 412 may be configured to or may comprise means for beginning learning addresses of the one or more detectors after expiry of the timer.

For example, the data logger device 20 may begin learning addresses of the detectors 4*a* after expiry of the timer.

In some optional implementations, the timer is configured to allow the fire alarm control panel 3 to learn a configuration of the fire alarm system 1 and log new detector values stored in the one or more data stores 8 of the fire alarm control panel 3 after being reset.

In some optional implementations, the timer is configured to expire in 2 minutes.

Figure 6:
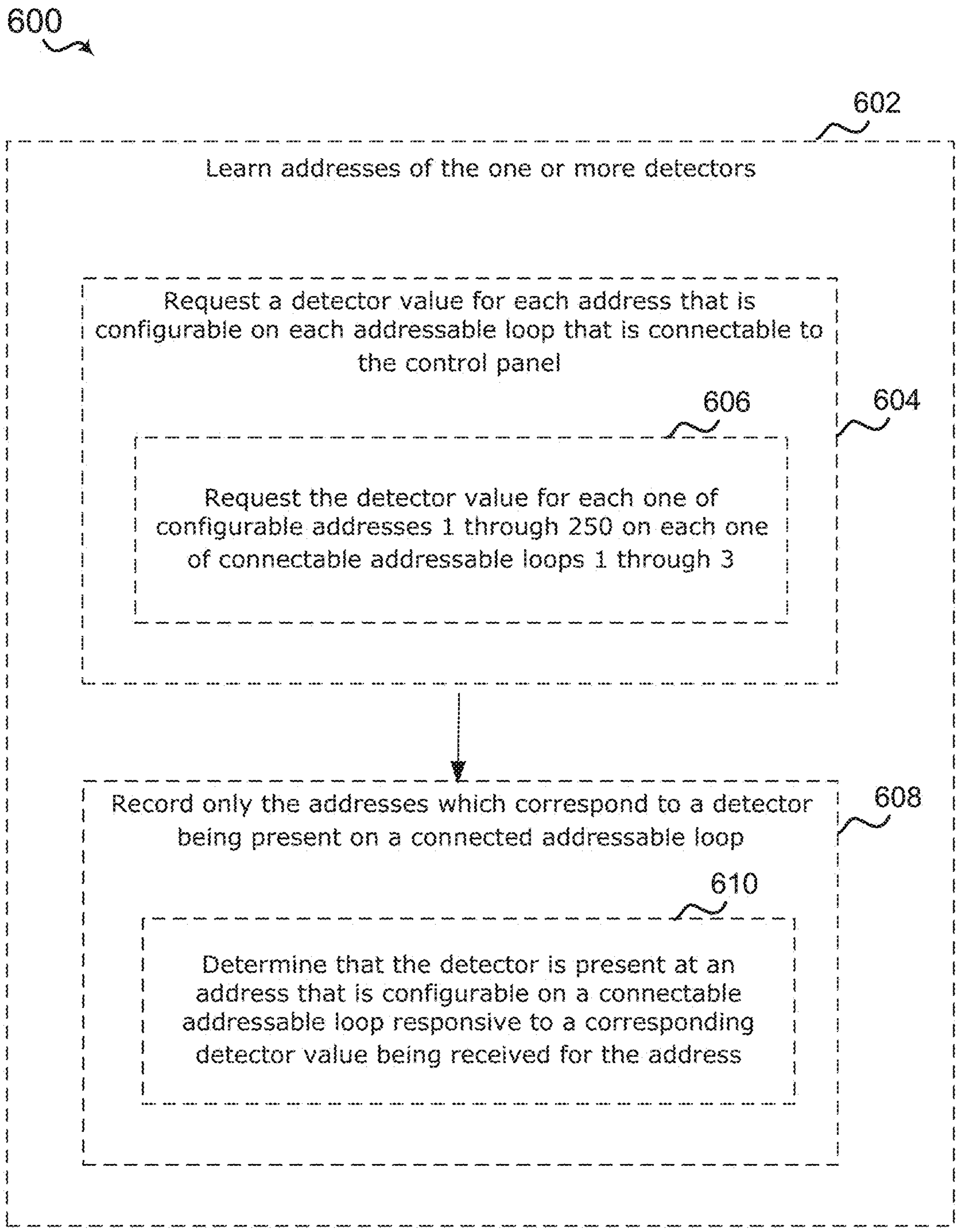
FIG. 6 is a flow diagram of an example method of learning addresses of detectors, according to some aspects of the present disclosure.

Referring to FIG. 6, in some optional implementations, at optional block 602 the method 600 includes learning addresses of the one or more detectors. For example, in an aspect, computing device 400, one or more processors 402 individually, as a subgroup, or in combination, one or more memories 404 individually, as a subgroup, or in combination, and/or data logging component 412 may be configured to or may comprise means for learning addresses of the one or more detectors.

For example, the data logger device 20 may learn addresses of the detectors 4*a*.

In some optional implementations, the learning at optional block 602 includes optional blocks 604, 606, 608, and 610 described below.

In some optional implementations, at optional block 604 the method 600 includes requesting a detector value for each address that is configurable on each addressable loop that is connectable to the fire alarm control panel. For example, in an aspect, computing device 400, one or more processors 402 individually, as a subgroup, or in combination, one or more memories 404 individually, as a subgroup, or in combination, and/or data logging component 412 may be configured to or may comprise means for requesting a detector value for each address that is configurable on each addressable loop that is connectable to the fire alarm control panel.

For example, the data logger device 20 may request a detector value for each address that is configurable on each addressable loop (e.g., wiring 2) that is connectable to the fire alarm control panel 3.

In some optional implementations, a maximum number of loops are connectable to the fire alarm control panel 3, and a maximum number of addresses are configurable on each loop that is connectable to the fire alarm control panel 3.

In some optional implementations, the maximum number of loops connectable to the fire alarm control panel 3 is 32 and the maximum number of addresses configurable on each loop is 250.

In some optional implementations, the requesting at optional block 604 includes optional blocks 606 at which the method 600 includes requesting the detector value for each one of configurable addresses 1 through 250 on each one of connectable addressable loops 1 through 3. For example, in an aspect, computing device 400, one or more processors 402 individually, as a subgroup, or in combination, one or more memories 404 individually, as a subgroup, or in combination, and/or data logging component 412 may be configured to or may comprise means for requesting the detector value for each one of configurable addresses 1 through 250 on each one of connectable addressable loops 1 through 3.

For example, the data logger device 20 may request a detector value for all addresses 1 through 250 on all addressable loops 1 through 3.

In some optional implementations, at optional block 608 the method 600 includes recording only the addresses which correspond to a detector being present on a connected addressable loop. For example, in an aspect, computing device 400, one or more processors 402 individually, as a subgroup, or in combination, one or more memories 404 individually, as a subgroup, or in combination, and/or data logging component 412 may be configured to or may comprise means for recording only the addresses which correspond to a detector being present on a connected addressable loop.

For example, the data logger device 20 may record only the addresses which correspond to a detector 4*a* being present on a connected addressable loop (e.g., wiring 2).

In some optional implementations, the recording at optional block 608 includes optional block 610 at which the method 600 includes determining that the detector is present at an address that is configurable on a connectable addressable loop responsive to a corresponding detector value being received for the address. For example, in an aspect, computing device 400, one or more processors 402 individually, as a subgroup, or in combination, one or more memories 404 individually, as a subgroup, or in combination, and/or data logging component 412 may be configured to or may comprise means for determining that the detector is present at an address that is configurable on a connectable addressable loop responsive to a corresponding detector value being received for the address.

For example, the data logger device 20 may determine that the detector 4*a* is present at an address that is configurable on a connectable addressable loop (wiring 2) responsive to a corresponding detector value being received for the address.

Figure 7:
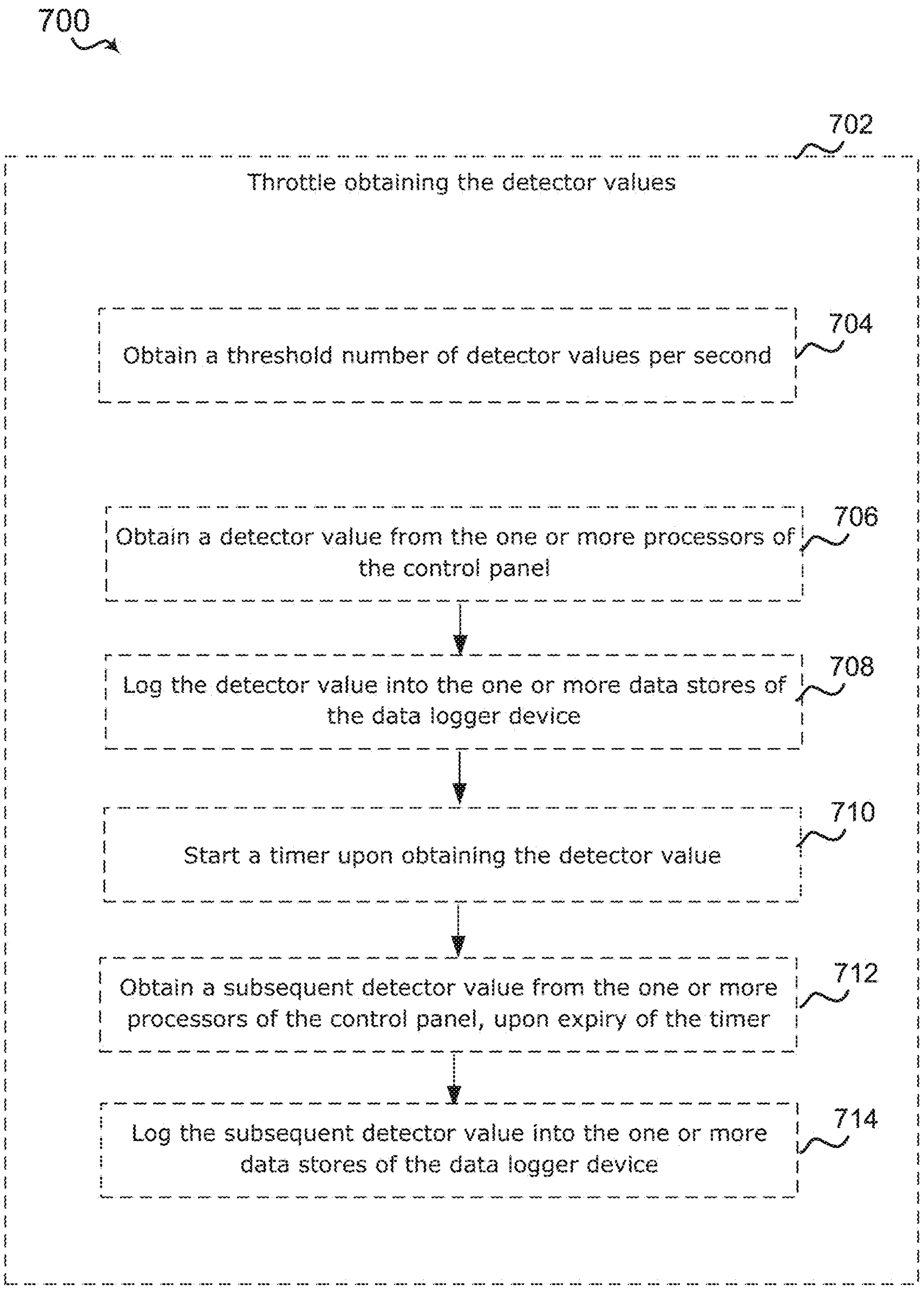
FIG. 7 is a flow diagram of an example method of throttling data logging, according to some aspects of the present disclosure.

Referring to FIG. 7, an optional method 700 of obtaining detector values is provided.

In some optional implementations, at optional block 702 the method 700 includes throttling obtaining detector values. For example, in an aspect, computing device 400, one or more processors 402 individually, as a subgroup, or in combination, one or more memories 404 individually, as a subgroup, or in combination, and/or data logging component 412 may be configured to or may comprise means for throttling obtaining detector values.

For example, the data logger device 20 may throttle obtaining detector values from the fire alarm control panel 3.

In some optional implementations, the throttling at optional block 702 includes optional block 704 at which the method 700 includes obtaining a threshold number of detector values per second. For example, in an aspect, computing device 400, one or more processors 402 individually, as a subgroup, or in combination, one or more memories 404 individually, as a subgroup, or in combination, and/or data logging component 412 may be configured to or may comprise means for obtaining a threshold number of detector values per second.

For example, the data logger device 20 may throttle obtaining detector values from the fire alarm control panel 3 by obtaining a threshold number of detector values per second.

In some optional implementations, the throttling at optional block 702 includes optional blocks 706, 708, 710, and 712 described below.

In some optional implementations, at optional block 706 the method 700 includes obtaining a detector value from the one or more processors of the fire alarm control panel. For example, in an aspect, computing device 400, one or more processors 402 individually, as a subgroup, or in combination, one or more memories 404 individually, as a subgroup, or in combination, and/or data logging component 412 may be configured to or may comprise means for obtaining a detector value from the one or more processors of the fire alarm control panel.

For example, the data logger device 20 may obtain a detector value from the one or more processors 7 of the fire alarm control panel 3.

In some optional implementations, at optional block 708 the method 700 includes logging the detector value into the one or more data stores of the data logger device. For example, in an aspect, computing device 400, one or more processors 402 individually, as a subgroup, or in combination, one or more memories 404 individually, as a subgroup, or in combination, and/or data logging component 412 may be configured to or may comprise means for logging the detector value into the one or more data stores of the data logger device.

For example, the data logger device 20 may log the detector value into the one or more data stores 22 of the data logger device 20.

In some optional implementations, at optional block 710 the method 700 includes starting a timer upon obtaining the detector value. For example, in an aspect, computing device 400, one or more processors 402 individually, as a subgroup, or in combination, one or more memories 404 individually, as a subgroup, or in combination, and/or data logging component 412 may be configured to or may comprise means for starting a timer upon obtaining the detector value.

For example, the data logger device 20 may start a timer upon obtaining the detector value.

In some optional implementations, at optional block 712 the method 700 includes obtaining a subsequent detector value from the one or more processors of the fire alarm control panel, upon expiry of the timer. For example, in an aspect, computing device 400, one or more processors 402 individually, as a subgroup, or in combination, one or more memories 404 individually, as a subgroup, or in combination, and/or data logging component 412 may be configured to or may comprise means for obtaining a subsequent detector value from the one or more processors of the fire alarm control panel, upon expiry of the timer.

For example, the data logger device 20 may obtain a subsequent detector value from the one or more processors 7 of the fire alarm control panel 3, upon expiry of the timer.

In some optional implementations, at optional block 714 the method 700 includes logging the subsequent detector value into the one or more data stores of the data logger device. For example, in an aspect, computing device 400, one or more processors 402 individually, as a subgroup, or in combination, one or more memories 404 individually, as a subgroup, or in combination, and/or data logging component 412 may be configured to or may comprise means for logging the subsequent detector value into the one or more data stores of the data logger device.

For example, the data logger device 20 may log the subsequent detector value into the one or more data stores 22 of the data logger device 20.

Some further aspects are described in the below clauses.

1. A fire alarm system comprising:
   - a fire alarm control panel having a casing, one or more processors, one or more data stores, and a data connection;
   - one or more detectors communicatively coupled with the fire alarm control panel via a wired or wireless connection; and
   - a data logger device located within the casing of the fire alarm control panel, the data logger device having one or more data stores and a data interface that is connected to the data connection of the fire alarm control panel, wherein the data logger device is configured to:
     - communicate, via the data interface of the data logger device that is connected to the data connection of the fire alarm control panel, with the one or more processors of the fire alarm control panel, to obtain detector values stored in the one or more data stores of the fire alarm control panel; and
     - log the detector values into the one or more logger data stores of the data logger device.
2. The fire alarm system of clause 1, wherein a portable data memory device is connectable to the data logger device, wherein the data logger device is further configured to download the detector values from the one or more data stores of the data logger device into the portable data memory device.
3. The fire alarm system of clause 1 or 2, wherein the data logger device further comprises logger control software installed thereon before logging data, wherein the logger control software is executable by the one or more processors of the data logger device to perform data logging.
4. The fire alarm system of any one of the above clauses, wherein the data logger device is configured to obtain the detector values by requesting, from the fire alarm control panel, one or more most recently returned values from each of the one or more detectors.
5. The fire alarm system of any one of the above clauses, wherein the fire alarm control panel further comprises a loop controller and one or more addressable loops connected to respective ones of a plurality of ports of the loop controller, wherein the data logger device is further configured to learn addresses of the one or more detectors by:

requesting a detector value for each address that is configurable on each addressable loop that is connectable to the fire alarm control panel; and recording only the addresses which correspond to a detector being present on a connected addressable loop.

6. The fire alarm system of clause 5, wherein the data logger device is further configured to determine that the detector is present at an address that is configurable on a connectable addressable loop responsive to a corresponding detector value being received for the address.

7. The fire alarm system of clause 5 or 6, wherein a maximum number of loops are connectable to the fire alarm control panel, wherein a maximum number of addresses are configurable on each loop that is connectable to the fire alarm control panel.

8. The fire alarm system of any one of clauses 5 to 7, wherein the maximum number of loops connectable to the fire alarm control panel is 32 and the maximum number of addresses configurable on each loop is 250.

9. The fire alarm system of any one of clauses 5 to 8, wherein the data logger device is configured to request the detector value by requesting the detector value for each one of configurable addresses 1 through 250 on each one of connectable addressable loops 1 through 3.

10. The fire alarm system of any one of the above clauses, wherein the data logger device is a single board computer.

11. The fire alarm system of any one of the above clauses, wherein the fire alarm control panel further comprises a power supply, wherein the data logger device is powered by the power supply of the fire alarm control panel.

12. The fire alarm system of clause 11, wherein the fire alarm control panel and the data logger device are configured to reset responsive to the power supply being turned off and turned back on.

13. The fire alarm system of clause 11 or 12, wherein the data logger device is further configured to reset by:

starting a timer subsequent to the power supply being turned back on; and beginning learning addresses of the one or more detectors after expiry of the timer.

14. The fire alarm system of clause 13, wherein the timer is configured to allow the fire alarm control panel to learn a configuration of the fire alarm system and log second detector values stored in the storage of the fire alarm control panel after being reset.

15. The fire alarm system of clause 13 or 14, wherein the timer is configured to expire in 2 minutes.

16. The fire alarm system of any one of the above clauses, wherein the data logger device is configured to throttle obtaining the detector values.

17. The fire alarm system of clause 16, wherein the data logger device is configured to throttle obtaining the detector values by obtaining a threshold number of detector values per second.

18. The fire alarm system of clause 16, wherein the data logger device is configured to throttle obtaining the detector values by:

obtaining a detector value from the one or more processors of the fire alarm control panel;

logging the detector value into the one or more data stores of the data logger device;

starting a timer upon obtaining the detector value;

obtaining a subsequent detector value from the one or more processors of the fire alarm control panel, upon expiry of the timer; and logging the subsequent detector value into the one or more data stores of the data logger device.

19. A fire alarm control panel of a fire alarm system, comprising:

a casing;

one or more processors;

one or more data stores;

a data connection; and a data logger device located within the casing of the fire alarm control panel, the data logger device having one or more data stores and a data interface that is connected to the data connection of the fire alarm control panel, wherein the fire alarm system comprises one or more detectors communicatively coupled with the fire alarm control panel via a wired or wireless connection, wherein the data logger device is configured to:

communicate, via the data interface of the data logger device that is connected to the data connection of the fire alarm control panel, with the one or more processors of the fire alarm control panel, to obtain detector values stored in the one or more data stores of the fire alarm control panel; and log the detector values into the one or more data stores of the data logger device.

20. A data logging method in a fire alarm system comprising a data logger device located in a casing of a fire alarm control panel of the fire alarm system, the data logging method comprising:

communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection; and logging the detector values into one or more data stores of the data logger device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A fire alarm system comprising:

a fire alarm control panel having a casing, one or more processors, one or more data stores, a power supply, and a data connection;

one or more detectors communicatively coupled with the fire alarm control panel via a wired or wireless connection; and a data logger device located within the casing of the fire alarm control panel, the data logger device having one or more data stores and a data interface that is connected to the data connection of the fire alarm control panel, wherein the data logger device is powered by the power supply of the fire alarm control panel, and wherein the fire alarm control panel and the data logger device are configured to reset responsive to the power supply being turned off and turned back on, wherein the data logger device is configured to:

communicate, via the data interface of the data logger device that is connected to the data connection of the fire alarm control panel, with the one or more processors of the fire alarm control panel, to obtain detector values stored in the one or more data stores of the fire alarm control panel; and log the detector values into the one or more logger data stores of the data logger device.

2. The fire alarm system of claim 1, wherein a portable data memory device is connectable to the data logger device, wherein the data logger device is further configured to download the detector values from the one or more data stores of the data logger device into the portable data memory device.

3. The fire alarm system of claim 1, wherein the data logger device further comprises logger control software installed thereon before logging data, wherein the logger control software is executable by the one or more processors of the data logger device to perform data logging.

4. The fire alarm system of claim 1, wherein the data logger device is configured to obtain the detector values by requesting, from the fire alarm control panel, one or more most recently returned values from each of the one or more detectors.

5. The fire alarm system of claim 1, wherein the fire alarm control panel further comprises a loop controller and one or more addressable loops connected to respective ones of a plurality of ports of the loop controller, wherein the data logger device is further configured to learn addresses of the one or more detectors by:

requesting a detector value for each address that is configurable on each addressable loop that is connectable to the fire alarm control panel; and recording only the addresses which correspond to a detector being present on a connected addressable loop.

6. The fire alarm system of claim 5, wherein the data logger device is further configured to determine that the detector is present at an address that is configurable on a connectable addressable loop responsive to a corresponding detector value being received for the address.

7. The fire alarm system of claim 5, wherein a maximum number of loops are connectable to the fire alarm control panel, wherein a maximum number of addresses are configurable on each loop that is connectable to the fire alarm control panel.

8. The fire alarm system of claim 7, wherein the maximum number of loops connectable to the fire alarm control panel is 32 and the maximum number of addresses configurable on each loop is 250.

9. The fire alarm system of claim 8, wherein the data logger device is configured to request the detector value by requesting the detector value for each one of configurable addresses 1 through 250 on each one of connectable addressable loops 1 through 3.

10. The fire alarm system of claim 1, wherein the data logger device is a single board computer.

11. The fire alarm system of claim 1, wherein the data logger device is further configured to reset by:

starting a timer subsequent to the power supply being turned back on; and beginning learning addresses of the one or more detectors after expiry of the timer.

12. The fire alarm system of claim 11, wherein the timer is configured to allow the fire alarm control panel to learn a configuration of the fire alarm system and log second detector values stored in the storage of the fire alarm control panel after being reset.

13. The fire alarm system of claim 12, wherein the timer is configured to expire in 2 minutes.

14. The fire alarm system of claim 1, wherein the data logger device is configured to throttle obtaining the detector values by obtaining a threshold number of detector values per second.

15. The fire alarm system of claim 14, wherein the data logger device is configured to throttle obtaining the detector values by:

obtaining a detector value from the one or more processors of the fire alarm control panel;

logging the detector value into the one or more data stores of the data logger device;

starting a timer upon obtaining the detector value;

obtaining a subsequent detector value from the one or more processors of the fire alarm control panel, upon expiry of the timer; and logging the subsequent detector value into the one or more data stores of the data logger device.

16. A fire alarm control panel of a fire alarm system, comprising:

a casing;

one or more processors;

one or more data stores;

a power supply;

a data connection; and a data logger device located within the casing of the fire alarm control panel, the data logger device having one or more data stores and a data interface that is connected to the data connection of the fire alarm control panel, wherein the data logger device is powered by the power supply of the fire alarm control panel, and wherein the fire alarm control panel and the data logger device are configured to reset responsive to the power supply being turned off and turned back on, wherein the fire alarm system comprises one or more detectors communicatively coupled with the fire alarm control panel via a wired or wireless connection, wherein the data logger device is configured to:

communicate, via the data interface of the data logger device that is connected to the data connection of the fire alarm control panel, with the one or more processors of the fire alarm control panel, to obtain detector values stored in the one or more data stores of the fire alarm control panel; and log the detector values into the one or more data stores of the data logger device.

17. A data logging method in a fire alarm system comprising a data logger device located within a casing of a fire alarm control panel of the fire alarm system, the data logging method comprising:

communicating, via a data interface of the data logger device that is connected to a data connection of the fire alarm control panel, with one or more processors of the fire alarm control panel, to obtain detector values stored in one or more data stores of the fire alarm control panel, wherein the fire alarm system comprises one or more detectors communicatively coupled with the fire alarm control panel via a wired or wireless connection; and logging the detector values into one or more data stores of the data logger device; and throttling, by the data logger device, obtaining the detector values, wherein the throttling comprises obtaining a threshold number of detector values per second.

18. A method of logging detector values from a control panel of a fire alarm system in which the control panel includes a casing, a processor, and a data connection, and the fire alarm system includes detectors, the method comprising:

placing within the casing of the control panel a data logger device having a logger storage and a data interface;

connecting the data interface of the data logger device to the data connection;

closing the casing of the control panel; and logging detector values from the control panel into the logger storage of the data logger device; and learning addresses of the detectors by requesting a detector value for each address that is configurable on each addressable loop that is connectable to the control panel, and recording only the addresses which correspond to a detector being present on a connected addressable loop.

19. The method according to claim 18, further comprising connecting a portable data memory device to the data logger device once the data logger device has logged detector values from the control panel.

20. The method of claim 18, further comprising installing logger control software on the logger storage before logging the detector values.

21. The method of claim 20, wherein the data logger device includes one or more processors, and wherein the logger control software is executable by the one or more processors of the data logger device to perform data logging.

22. The method of claim 18, wherein the logging of the detector values comprises the data logger device requesting from the control panel a most recently returned value from one of the detectors, and the data logger device repeating the requesting for the most recently returned value of each of the other detectors.

23. The method of claim 18, further comprising learning addresses of the detectors by requesting a detector value of every possible address at which a detector might be present, and recording the addresses which correspond to a detector being present.

* * * * *